3,203,899
MANUFACTURE OF MATERIALS CAPABLE OF AMPLIFYING WAVE ENERGY
Joseph V. Fisher, Ridge Road, R.D. 1, Valencia, Pa.
No Drawing. Filed Apr. 23, 1962, Ser. No. 189,302
4 Claims. (Cl. 252—62.5)

This invention relates to the manufacture of solid-state wave amplifying materials, and more particularly to the manufacture of materials capable of amplifying wave energy by stimulated emission of radiation.

Although not limited thereto, the present invention is particularly concerned with materials for amplifying microwave energy by stimulated emission of radiation (masers) and materials for amplifying light energy by such stimulated emission of radiation (lasers). Generally speaking, masers and lasers may be defined as devices for amplifying or generating wave energy by utilizing molecules in the excited state of a wave transition. Interaction between these excited molecules and a wave energy field produces additional radiation and hence amplification by "stimulated emission." The operation of masers and lasers is dependent upon the fact that in certain materials the electrons surrounding the nucleus of an atom may be in different energy states. These energy states may be thought out as arising from the interaction of the electron spins with internal or external fields. We may therefore refer to them as electron "spin states." The energies of the electron spin states may be varied by an external wave energy field; and the energy difference between two given electron spin states is determined by the magnitude of the external field.

For example, part of the electron spins in certain materials may be at a lower energy state $E_1$, while the remainder may be at a higher energy state $E_2$. The material capable of amplifying wave energy by stimulated emission of radiation is in thermal equilibrium, corresponding to a normal or relaxed condition, when there is an excess electron spin population in the lower energy state $E_1$. Electron spins in the energy states $E_1$ and $E_2$ can interact with a radiation field of appropriate frequency and either absorb energy from the radiation field while advancing to a state of greater energy or, under the influence of the radiation field, can give up some of their energy and drop to a state of lower energy. The amount of energy thus transferred (i.e., $E_2-E_1$) is related to the frequency of the radiation field by the following equation:

$$E_2-E_1 = hV$$

where $h$ is Planck's constant and $V$ is the frequency.

If a suitable material having an excess electron spin population and a higher energy state is placed in a resonant cavity or the like and if wave energy of appropriate frequency is fed into the cavity in the case of a maser, or pumped into the material in the case of a laser, the electron spins in the higher energy state will revert to a lower energy state, thereby releasing energy which amplifies the signal pumped into the material.

In the case of a maser, the material capable of amplifying wave energy by stimulated emission of radiation is placed within a resonant cavity, and a magnetic field applied across the material to create an excess spin population in the upper energy level. In the case of lasers, the material capable of amplifying wave energy by stimulated emission of radiation is placed within a resonator comprising a pair of spaced mirrors operated by a distance equal to an even multiple of the wave length which it is desired to amplify. By pumping light energies of many different frequencies into the material, a steady oscillation of a single wave length can be built up between the mirrors.

As an overall object, the present invention seeks to provide a new and improved process for manufacturing single crystal materials capable of amplifying wave energy by stimulated emission of radiation.

More specifically, an object of the invention is to provide a process for manufacturing materials of the type described capable of producing single crystals of controlled composition and extremely high purity.

In order to successfully produce materials capable of amplifying wave energy by stimulated emission of radiation, the material must exist as a single crystal and must be as pure as possible, on the order of 99% or greater purity. It has been found that certain host materials, when doped with rare earths or transition elements in minute amounts and formed into single crystals, will amplify wave energy by stimulated emission of radiation. Such host materials include, without limitation, the following:

Calcium fluoride ($CaF_2$)
Barium fluoride ($BaF_2$)
Cadmium fluoride ($CdF_2$)
Strontium fluoride ($SrF_2$)
Manganese fluoride ($MnF_2$)
A mixture of strontium fluoride and calcium fluoride
A mixture of strontium fluoride and barium fluoride
A mixture of strontium fluoride, barium fluoride and calcium fluoride In the manufacture of materials capable of amplifying wave energy by stimulated emission of radiation, one or more of the host materials enumerated above are mixed with about 0.005 to 3 mole percent of a rare earth or transition element, depending upon requirements, selected from the following, it being understood that other possible elements may be employed without departing from the spirit and scope of the invention:

Chromium (Cr)
Cobalt (Co)
Dysprosium (Dy)
Erbium (Er)
Europium (Eu)
Gadolinium (Gd)
Holmium (Ho)
Iron (Fe)
Lanthanum (La)
Lead (Pb)
Lutecium (Lu)
Manganese (Mn)
Neodymium (Nd)
Nickel (Ni)
Praseodymium (Pr)
Samarium (Sm)
Terbium (Tb)
Thulium (Tm)
Titanium (Ti)
Vanadium (V)
Ytterbium (Yb)
Zinc (Zn)

In manufacturing the crystals, the host material and about 0.005 to 3 mole percent of a selected rare earth or transition element, or combination of rare earths and transition elements, usually in the form of a halide, are mixed together and heated in a graphite crucible or mold to the melting temperature of the mixture, the mold being withdrawn from the heating zone gradually, usually over a period of days, whereby a single crystal will grow from a seed at one end of the mold progressing toward the other end as the mold is withdrawn from the heating zone.

If an attempt were made to grow crystals by simply mixing the host material with the rare earth metal or metals and heating the mixture, the resulting product would be very impure, due primarily to the fact that the rare earth metals, when heated, form oxides which contaminate the crystals. In an effort to eliminate the oxides, various leaching or reducing agents have been mixed with the host material and rare earth additions, such that when the mixture is heated in the mold, the leaching agent will combine with the oxides and volatilize or boil off. For example, one agent heretofore used and described in the literature is lead fluoride. This material, although being an excellent leaching agent which will prevent the inclusion of oxides in the crystal, unfortunately combines or otherwise reacts with the rare earth elements themselves and causes a reduction in the rare earth content of the crystal. Consequently, it is extremely difficult to produce crystals with this leaching agent having a specified rare earth content.

The present invention resides in the discovery that ammonium fluoride, rather than lead fluoride, forms an excellent leaching agent which performs the required reduction but does not at the same time dilute the rare earth addition to the host material. Usually, the weight of ammonium fluoride added to the mixture before melting should be at least four times the weight of the rare earth addition.

The following are specific examples of crystals grown in accordance with the invention:

Example I

Eighty grams of calcium fluoride ($CaF_2$) were thoroughly mixed with one gram of ammonium fluoride ($NH_4F$) and one hundred milligrams of samarium fluoride ($SmF_3$) and placed in a cylindrical graphite mold or crucible having a diameter in the range of $5/16$ to $3/4$ inch. Thereafter, the mixture was heated to the range of about 1300° C. to 1500° C. in a vacuum whereby the ammonium gas, combined with excess water and oxides, boils off at about 200° C. to 500° C. during the heat-up period, and the mold withdrawn from the heating zone at a rate of about 3 inches per day to form a single pure crystal which grows from a seed at the bottom of the mold. The resulting crystal had a purity of 99+% and contained about 0.10 mole percent of samarium.

Example II

Eighty grams of barium fluoride ($BaF_2$) were thoroughly mixed with two grams of ammonium fluoride ($NH_4F$) and one-half gram of gadolinium fluoride ($GdF_2$) and placed in an elongated graphite mold or crucible of $5/16$ to $3/4$ inch diameter. Thereafter, the mixture was heated to the range of about 1200° C. to 1500° C. in a vacuum to facilitate boiling off of the ammonium fluoride and impurities, and the mold withdrawn from the heating zone at a rate of about 3 inches per day to form a single pure crystal starting from a seed at the bottom of the mold. The resulting crystal again had a purity of 99+% and contained about 0.50 mole percent of gadolinium.

Example III

Eighty grams of calcium fluoride ($CaF_2$) were thoroughly mixed with one gram of neodymium fluoride ($NdF_2$) and five grams of ammonium fluoride ($NH_4F$) and placed in an elongated graphite mold or crucible. The mixture was heated to the range of about 1300° C. to 1500° C. in a vacuum, and the mold withdrawn from the heating zone at a rate of about 3 inches per day, to form a single pure crystal. The resulting crystal had a purity of 99+% and contained about 1 mole percent of neodymium.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In the process for manufacturing single crystals of a material capable of amplifying wave energy by stimulated emission of radiation, the steps of mixing a fluoride host material with ammonium fluoride and about 0.005 to 3 mole percent of an element in compound form selected from the group consisting of the rare earths and transition elements, and heating said mixture to its melting point to permit the ammonium fluoride to combine with impurities and volatilize, leaving a pure mixture of the host material and an element selected from the rare earths and transition elements.

2. A process for manufacturing single crystals of a material capable of amplifying wave energy by stimulated emission of radiation comprising the steps of mixing a fluoride host material with ammonium fluoride and about 0.005 mole percent to 3 mole percent of an element in compound form selected from the group consisting of the rare earths and transition elements, heating said mixture to its melting point in an elongated mold positioned within a heating zone until it is thoroughly melted, and thereafter gradually withdrawing the mold from the heating zone whereby a single crystal will grow starting at the bottom of the mold.

3. A process for manufacturing single crystals of a material capable of amplifying wave energy by stimulated emission of radiation comprising the steps of mixing a fluoride host material with ammonium fluoride and about 0.005 to 3 mole percent of an element in compound form selected from the group consisting of the rare earths and transition elements, the weight of the ammonium fluoride being at least four times the weight of the rare earth, heating said mixture to its melting point in an elongated mold positioned within a heating zone until it is thoroughly melted, and thereafter gradually withdrawing the mold from the heating zone whereby a single crystal will be formed from a seed starting at the bottom of the mold.

4. A process for manufacturing single crystals of a material capable of amplifying wave energy by stimulated emission of radiation comprising the steps of mixing a host material with ammonium fluoride and about 0.005 to 3 mole percent of an element in compound form selected from the group consisting of the rare earths and transition elements, the host material being selected from the group consisting of calcium fluoride, barium fluoride, cadmium fluoride, strontium fluoride, manganese fluoride, a mixture of strontium fluoride and calcium fluoride, a mixture of strontium fluoride and barium fluoride, and a mixture of strontium fluoride, barium fluoride and calcium fluoride, heating said mixture to its melting point in an elongated mold positioned within a heating zone until it is thoroughly melted, and thereafter gradually withdrawing the mold from the heating zone whereby a single crystal will grow starting at the bottom of the mold.

References Cited by the Examiner

UNITED STATES PATENTS

| 3,003,112 | 10/61 | Van Uitert | 252—62.5 |
| 3,079,347 | 2/63 | Garrett et al. | 252—301.4 |
| 3,091,540 | 5/63 | Nielsen | 252—62.5 |

FOREIGN PATENTS

| 377,079 | 7/32 | Great Britain. |

MAURICE A. BRINDISI, *Primary Examiner.*